March 10, 1925. 1,529,089
D. R. SCHOLES
WHEEL
Filed June 28, 1924
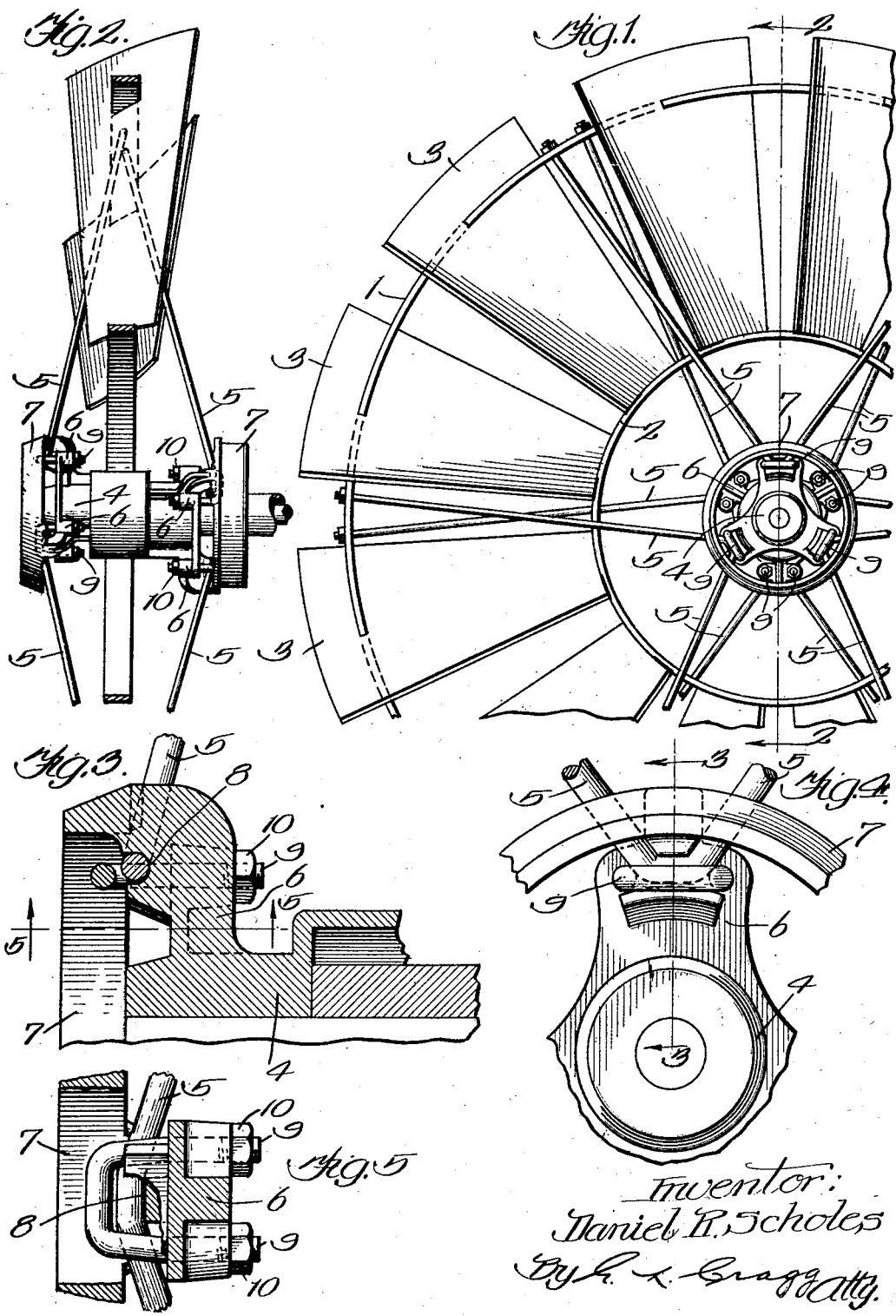
Inventor:
Daniel R. Scholes Patented Mar. 10, 1925.

1,529,089

UNITED STATES PATENT OFFICE.

DANIEL R. SCHOLES, OF CHICAGO, ILLINOIS, ASSIGNOR TO AERMOTOR COMPANY, OF CHICAGO, ILLINOIS, A CORPORATION OF ILLINOIS.

WHEEL.

Application filed June 28, 1924. Serial No. 723,008.

*To all whom it may concern:*

Be it known that I, DANIEL R. SCHOLES, a citizen of the United States, residing at Chicago, in the county of Cook and the State of Illinois, have invented a certain new and useful Improvement in Wheels, of which the following is a full, clear, concise, and exact description.

My invention relates to wheels, the wheel of my invention being of particular service in the construction of windmills, although the invention is not to be limited to any particular use to which it may be put.

The invention has for its general object the provision of an improved assembly between the spokes and hub of a wheel. The wheel of my invention includes webs upon and distributed about the hub and extended at their outer ends in the plane of the wheel, the webs being formed with spoke receiving pockets extending along the wheel axis, spokes interposed between the web extensions and hub and having their inner ends received in said pockets, and bolts assembled with said webs and having portions in wedging engagement with and between sides of the pockets and the inner ends of the spokes.

The invention will be more fully explained in connection with the accompanying drawing in which Fig. 1 is a face view of a portion of the wheel as I preferably construct it for use in a windmill; Fig. 2 is a sectional view on line 2—2 of Fig. 1; Fig. 3 is a sectional view on line 3—3 of Fig. 4; Fig. 4 is a view on a larger scale of a part of the central portion of the wheel structure as it is illustrated in Fig. 1; and Fig. 5 is a sectional view on line 5—5 of Fig. 3.

The wheel illustrated includes two concentric or coaxial rings 1 and 2 with which are assembled the sail portions or blades 3 to constitute the structure a wind wheel. The outer ring 1 is assembled with the wheel hub 4 by means of spokes 5. The spokes are desirably arranged in two sets, the inner ends of the spokes of one set being assembled with one end of the hub and the inner ends of the spokes of the other set being assembled with the other end of the hub. The spokes of each set are desirably constructed in pairs, the spokes of each pair being made of a rod that is shaped into V form, the inner ends of the spokes of each pair being at the base of the V and therefore common to these spokes. Webs 6 are cast integrally upon and are distributed about each end of the hub. The webs at each end of the hub are extended at their outer ends in the general plane of the wheel, the web extensions at each end of the hub being preferably connected to form a continuous ring 7. Spoke receiving pockets 8 are formed in the webs and extend outwardly from the hubs along the wheel axes. The spokes of each set are interposed between the corresponding ring 7 and the webs that are contiguous to these spokes, the inner ends of such spokes being received in the corresponding pockets 8. Each web 6 is penetrated by the sides of a U bolt 9 along the axis of the wheel, the base of this U bolt being forced, by means of the nuts 10 upon the bolt, into tight wedging engagement with and between sides of the pockets and the common inner end of the spokes of the pair pertaining to the particular web. The spokes of the wheel and the parts that are assembled with the balance of the wheel by means of these spokes are thus very firmly held in assembly with the wheel hub.

While the spokes are preferably formed in pairs and the bolts which assemble them with the hub are preferably of U form, I do not wish to be limited to such characteristics.

I claim:

1. In a wheel, the combination with the hub thereof; of webs upon and distributed about the hub and extended at their outer ends in the plane of the wheel, said web extensions being connected to form a ring and the webs being formed with spoke receiving pockets extending along the wheel axis; spokes interposed between the ring and hub and having their inner ends received in said pockets; and bolts assembled with said webs and having portions in wedging engagement with and between sides of the pockets and the inner ends of the spokes.

2. In a wheel, the combination with the hub thereof; of webs upon and distributed about the hub and extended at their outer ends in the plane of the wheel, said web extensions being connected to form a ring and the webs being formed with spoke receiving pockets extending along the wheel axis; pairs of spokes interposed between the ring and hub and made of rods shaped in V form, the inner ends of these spokes being common thereto and received in said pockets; and U bolts assembled with said webs and having their base portions in wedging engagement with and between sides of the pockets and the common inner ends of the spokes of each pair.

3. In a wheel, the combination with the hub thereof; of webs upon and distributed about the hub and extended at their outer ends in the plane of the wheel, the webs being formed with spoke receiving pockets extending along the wheel axis; spokes interposed between the web extensions and hub and having their inner ends received in said pockets; and bolts assembled with said webs and having portions in wedging engagement with and between sides of the pockets and the inner ends of the spokes.

4. In a wheel, the combination with the hub thereof; of webs upon and distributed about the hub and each extended at its outer end in both directions in the plane of the wheel, the webs being formed with spoke receiving pockets extending along the wheel axis; pairs of spokes interposed between the web extensions and hub and made of rods shaped in V form, the inner ends of these spokes being common thereto and received in said pockets; and U bolts assembled with said webs and having their base portions in wedging engagement with and between sides of the pockets and the common inner ends of the spokes of each pair.

In witness whereof, I hereunto subscribe my name.

DANIEL R. SCHOLES.